US008323781B2

(12) United States Patent
Wu

(10) Patent No.: US 8,323,781 B2

(45) Date of Patent: Dec. 4, 2012

(54) INTERMEDIATE TRANSFER MEMBER AND METHOD OF MANUFACTURE

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 58 days.

(21) Appl. No.: 12/917,724

(22) Filed: Nov. 2, 2010

(65) Prior Publication Data

US 2012/0107516 A1 May 3, 2012

(51) Int. Cl.
*C08F 2/48* (2006.01)

(52) U.S. Cl. ..................... 428/206; 428/195.1; 399/308; 427/519

(58) Field of Classification Search ............... 428/195.1, 428/206; 399/308; 427/519
See application file for complete search history.

(56) References Cited

U.S. PATENT DOCUMENTS

| | | | | |
|---|---|---|---|---|
| 4,711,833 | A | 12/1987 | McAneney et al. | |
| 5,021,036 | A | 6/1991 | Tanaka et al. | |
| 5,162,183 | A | 11/1992 | Lindblad et al. | |
| 5,187,039 | A | 2/1993 | Meyer | |
| 5,300,391 | A | 4/1994 | Fabian et al. | |
| 5,389,412 | A | 2/1995 | Tanaka et al. | |
| 5,714,248 | A | 2/1998 | Lewis | |
| 6,139,784 | A | 10/2000 | Oshima et al. | |
| 6,500,367 | B2 | 12/2002 | Naus et al. | |
| 7,008,589 | B1 | 3/2006 | Poulakis | |
| 7,524,597 | B2 | 4/2009 | Mishra et al. | |
| 7,645,547 | B2 | 1/2010 | Okuda et al. | |
| 2003/0008116 | A1 * | 1/2003 | Williams et al. | 428/195 |
| 2004/0051211 | A1 | 3/2004 | Mastro et al. | |
| 2006/0204743 | A1 * | 9/2006 | Beck et al. | 428/323 |
| 2007/0116958 | A1 * | 5/2007 | Suzuki et al. | 428/411.1 |
| 2007/0128365 | A1 * | 6/2007 | Koch et al. | 427/299 |
| 2011/0024024 | A1 | 2/2011 | Pietrantoni et al. | |
| 2011/0123732 | A1 | 5/2011 | Foley et al. | |
| 2011/0233475 | A1 | 9/2011 | Foley et al. | |
| 2012/0009352 | A1 | 1/2012 | Foley et al. | |
| 2012/0104661 | A1 | 5/2012 | Wu | |
| 2012/0146265 | A1 | 6/2012 | Wu | |

OTHER PUBLICATIONS

U.S. Appl. No. 12/835,104, filed Jul. 13, 2010, Office Action dated Jul. 9, 2012.

* cited by examiner

*Primary Examiner* — Gerard Higgins
*Assistant Examiner* — Christopher Polley
(74) *Attorney, Agent, or Firm* — Hoffman Warnick LLC

(57) ABSTRACT

There is described a method of forming a transfer member suitable for use with an image forming system. The method includes coating an ultraviolet (UV) curable mixture comprising a chlorinated polyester resin, a reactive diluent, conductive species and a photoinitiator on a substrate. The UV curable mixture is cured with ultraviolet energy. The cured mixture is then removed from the substrate.

11 Claims, 2 Drawing Sheets

INTERMEDIATE TRANSFER MEMBER AND METHOD OF MANUFACTURE

CROSS REFERENCE TO RELATED APPLICATIONS

This application relates to commonly assigned copending application Ser. No. 12/917,730, SEAMLESS INTERMEDIATE TRANSFER PROCESS, filed simultaneously herewith and incorporated by reference herein.

BACKGROUND

1. Field of Use

This disclosure is generally directed to a novel layer useful in electrophotographic imaging apparatuses, including digital, image on image, and the like.

2. Background

In electrophotographic printing, materials used in intermediate transfer members typically are composed of conductive powders dispersed in polyimide resins. The intermediate transfer member is typically a belt and the belt can be seamed or seamless (U.S. Pat. No. 6,139,784 from Gunze Limited, Ayabe, Japan). The polyimide resin includes thermoplastic polyimide resins and thermosetting polyimide resins such as polyimides and precursors of polyimides, and polyamideimides. The conductive powder includes carbon blacks, acetylene black, stannic oxide, indium oxide, potassium titanate and other types of conductive and semi-conductive powders that can be employed.

However, certain issues arise when using polyimides for intermediate transfer members. These include environmental emissions during manufacture and high cost due to complex manufacturing processes. Further, the performance of intermediate transfer members with respect to stain, abrasion and solvent resistance can be improved. The properties of superior toughness and high gloss are also required by intermediate transfer members. Materials satisfying the above requirements would be desirable.

SUMMARY

According to an embodiment, there is described a method of forming a transfer member suitable for use with an image forming system. The method includes coating an ultraviolet (UV) curable mixture comprising a chlorinated polyester resin, a reactive diluent, conductive species and a photoinitiator on a substrate. The UV curable mixture is cured with ultraviolet energy. The cured mixture is then removed from the substrate.

According to another embodiment, there is described an intermediate transfer belt (ITB) comprising a ultraviolet cured chlorinated polyester having dispersed therein conductive species.

According to another embodiment there is described a coating composition, comprising a mixture of an ultraviolet (UV) curable mixture comprising a chlorinated polyester resin, a reactive diluent, conductive species and a photoinitiator.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

In the following description, reference is made to the chemical formulas that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Figure 1:
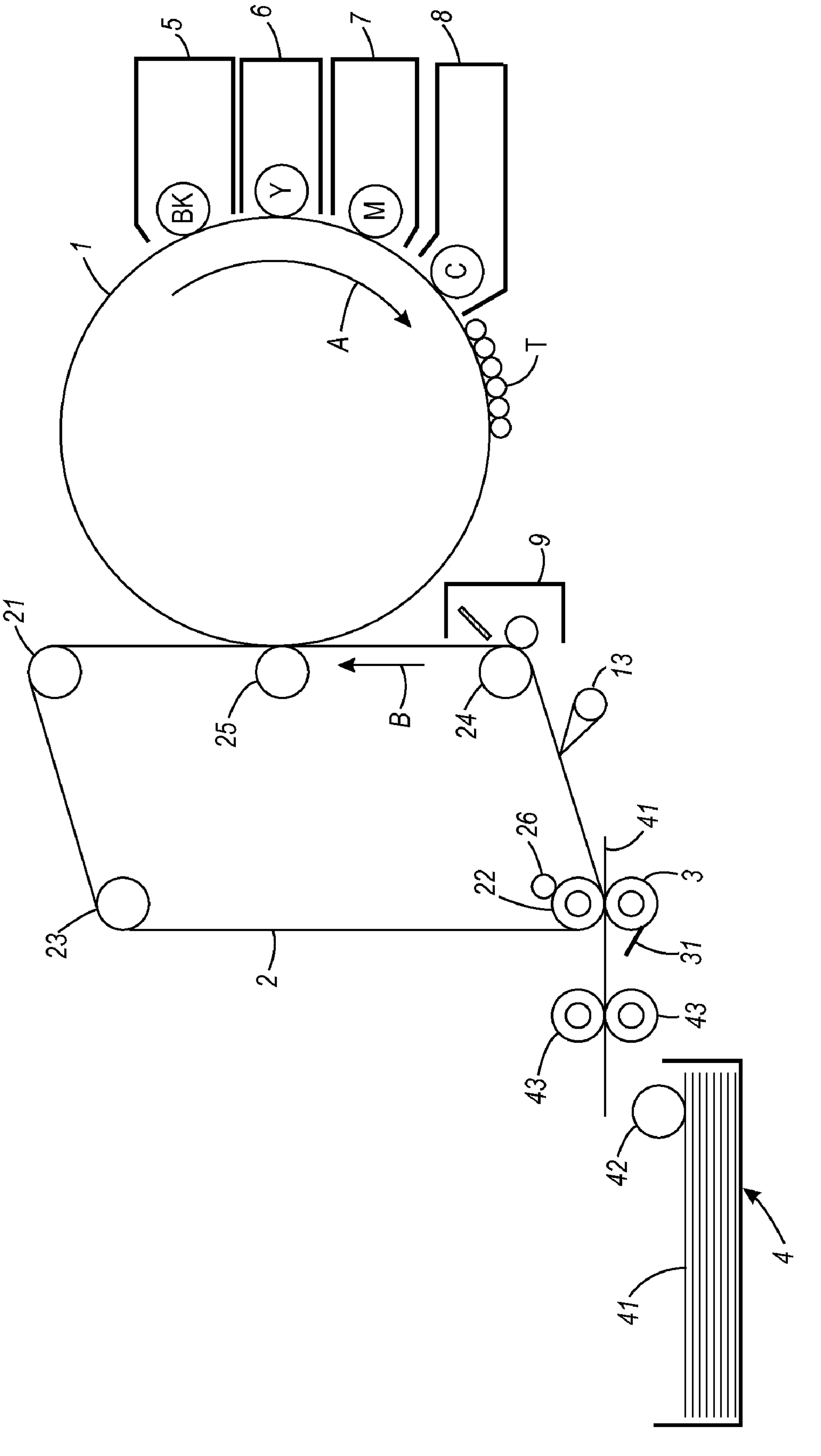
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as a contact type charger using conductive or semiconductive roller, brush, film and rubber blade, scorotron charger or corotron charge making use of corona discharge, and others. Above all, the contact type charging unit has excellent charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be the same as the first transfer unit such as a contact type transfer charger using transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as heat roller fixing unit and oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as an image carrier, a transfer member 2 as an intermediate transfer member such as a transfer belt, a bias roller 3 as a transfer electrode, a tray 4 for feeding paper as a transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with the backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer member 2 is transferred thereon by rotation of the transfer member 2.

The paper 41 on which the toner image is transferred is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the substrate can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

Disclosed herein is a composition comprising a chlorinated polyester, a UV-curable diluent, a conductive species and a photoinitiator, where a homogeneous solution is formed by mixing these components, and unlike a carbon-black based intermediate transfer member, no further dispersing process is involved in the preparation of the intermediate transfer member. The composition is cured through UV radiation to produce an intermediate transfer member. After coating the composition and UV curing, a UV cured intermediate transfer belt (ITB) is obtained with functional resistivity, modulus and print quality.

Figure 2:
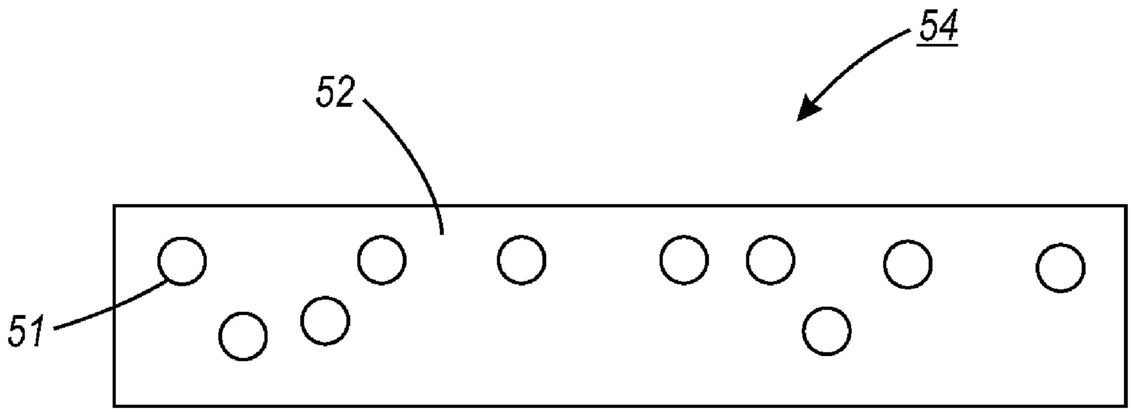
FIG. 2 is a schematic representation of an embodiment disclosed herein.

In an embodiment shown in FIG. 2, the intermediate transfer member 54 is in the form of a film in a one layer configuration. An intermediate transfer member 54 includes a single layer comprising a polymer 52 formed from a chlorinated polyester, a UV-curable diluent and a photoinitiator. In addition, a conductive species 51 is dispersed within the polymer 52.

In addition, there are nearly zero VOC emissions produced during the manufacture of the ITB.

The formed intermediate transfer belt (ITB) can have a surface resistivity ranging from about $10^8$ ohms/sq to about $10^{13}$ ohms/sq, or ranging from about $10^9$ ohms/sq to about $10^{12}$ ohms/sq, or ranging from about $10^{10}$ ohms/sq to about $10^{11}$ ohms/sq. In embodiments, the formed ITB coating can have a mechanical Young's modulus ranging from about 500 MPa to about 10,000 MPa, or ranging from about 1,000 MPa to about 5,000 MPa, or ranging from about 1,500 MPa to about 3,000 MPa. In embodiments, the ITB can be seamless. In embodiments, the ITB has a total thickness of from about 30 microns to about 500 microns.

The chlorinated polyester resin is a modified aliphatic unsaturated polyester resin based on maleic anhydride and a glycol. Examples of the chlorinated polyester resin include GENOMER® 6043, 6050, 6052, 6054, all available from RAHN USA Corp., Aurora, Ill. The chlorinated polyester is formed from the reaction of maleic acid at a weight percent of from about 10 to about 50, or from about 20 to about 40, or from about 25 to about 35, adipic acid at a weight percent of from about 5 to about 45, or from about 15 to about 35, or from about 20 to about 30, diethylene glycol at a weight percent of from about 5 to about 45, or from about 15 to about 35, or from about 20 to about 30, and a chlorinated aromatic aliphatic diol at a weight percent of from about 5 to about 40, or from about 10 to about 30, or from about 15 to about 25. The chlorinated polyester comprises a number average molecular weight (Mn) of from about 500 to about 5,000, or from about 700 to about 3,000, or from about 900 to about 1,500. The chlorinated polyester comprises weight average molecular weight (Mw) of from about 1,000 to about 20,000, or from about 3,000 to about 10,000, or from about 5,000 to about 8,000.

The UV curable diluents include trimethylolpropane triacrylate, hexandiol diacrylate, tripropyleneglycol diacrylate, dipropyleneglycol diacrylate, proxylated neopentylglycol diacrylate, hexamethylene diacrylate, and the like and mixtures thereof.

The disclosed conductive species 51 are selected from a group including esters of phosphoric acid such as STEPFAC® 8180, 8181, 8182 (phosphate esters of alkyl polyethoxyethanol), 8170, 8171, 8172, 8173, 8175 (phosphate esters of alkylphenoxy polyethoxyethanol), POLYSTEP® P-11, P-12, P-13 (phosphate esters of tridecyl alcohol ethoxylates), P-31, P-32, P-33, P-34, P-35 (phosphate esters of alkyl phenol ethoxylates), all available from Stepan Corporation; salts of organic sulfonic acid such as sodium sec-alkane sulfonate (ARMOSTAT® 3002 from AKZO Nobel) and sodium C10-C18-alkane sulfonate (HOSTASTAT® HS1FF from Clariant); esters of fatty acids such as HOSTASTAT® FE20liq from Clariant (Glycerol fatty acid ester); ammonium or phosphonium salts such as benzalkonium chloride, N-benzyl-2-(2,6-dimethylphenylamino)-N,N-diethyl-2-oxoethanaminium benzoate, cocamidopropyl betaine, hexadecyltrimethylammonium bromide, methyltrioctylammonium chloride, and tricaprylylmethylammonium chloride, behentrimonium chloride (docosyltrimethylammonium chloride), tetradecyl(trihexyl)phosphonium chloride, tetradecyl(trihexyl)phosphonium decanoate, trihexyl(tetradecyl)phosphonium bis 2,4,4-trimethylpentylphosphinate, tetradecyl(trihexyl)phosphonium dicyanamide, triisobutyl(methyl) phosphonium tosylate, tetradecyl(trihexyl)phosphonium bistriflamide, tetradecyl(trihexyl)phosphonium hexafluorophosphate, tetradecyl(trihexyl)phosphonium tetrafluoroborate, Ethyl tri(butyl)phosphonium diethylphosphate, etc. The weight ratio of the conductive species 51 ranges from about 5 to about 30, or from about 10 to about 25, or from about 15 to about 20 weight percent of the total ITB. The surface resistivity range of the intermediate transfer belt is from about $10^8$ ohms/square to about $10^{13}$ ohms/square, or from about $10^{10}$ ohms/square to about $10^{12}$ ohms/square. The volume resistivity of the intermediate transfer belt is from about $10^8$ ohm-cm to about $10^{12}$ ohm-cm, or from about $10^9$ ohm-cm to about $10^{11}$ ohm-cm.

Any suitable photoinitiators can be used including, but not limited to, acyl phosphines, α-hydroxyketones, benzyl ketals, α-aminoketones, and mixtures thereof, which photoinitiators are selected in various suitable amounts, such as illustrated herein, and, for example, from about 0.1 to about 20 weight percent, or from about 1 to about 10 weight percent, or from about 3 to about 7 weight percent, or from 1 to about 5 weight percent of the UV cured layer components.

The coating mixture or solution is coated in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, and the like.

The disclosed UV curable mixture is coated via draw bar coating on a glass substrate, and then UV cured with an energy of greater than 500 mJ/cm$^2$, or greater than 1,000 mJ/cm$^2$, or greater than 5,000 mJ/cm$^2$. The solidified ITB film is removed from the glass substrate, and an about 30-150 micron UV cured ITB device can be obtained.

Specific embodiments will now be described in detail. These examples are intended to be illustrative, and not limited to the materials, conditions, or process parameters set forth in these embodiments. All parts are percentages by solid weight unless otherwise indicated.

While embodiments have been illustrated with respect to one or more implementations, alterations and/or modifications can be made to the illustrated examples without departing from the spirit and scope of the appended claims. In addition, while a particular feature herein may have been disclosed with respect to only one of several implementations, such feature may be combined with one or more other features of the other implementations as may be desired and advantageous for any given or particular function.

EXAMPLES

Experimentally, about 10 grams of STEPFAC® 8180, a phosphate ester of alkyl polyethoxyethanol (Stepan Corporation, Northfield, Ill.) was mixed with about 85 grams of GENOMER® 6054, a chlorinated polyester resin in proxylated neopentylglycol diacrylate ($M_n$=1,000 and $M_w$=7,300, RAHN USA Corp., Aurora, Ill.). About 5 grams of IRGACURE® 500 (Ciba Specialty Chemicals, Tarrytown, N.Y.) was added to the above mixture to form a homogeneous coating solution, where IRGACURE® 500 is a 1/1 mixture of 1-hydroxy-cyclohexyl-phenyl-ketone and benzophenone.

The coating solution was coated on a glass plate using a draw bar coating method, and subsequently cured using a Hanovia UV instrument (Fort Washington, Pa.) for about 40 seconds at a wavelength of about 325 nm (about 250 watts). The UV cured composite film (GENOMER® 6054/STEPFAC® 8180/IRGACURE® 500=85/10/5) was then released from the glass plate and had a thickness of about 100 μm.

The intermediate transfer member was measured for surface resistivity (averaging four to six measurements at varying spots, 72° F./65% room humidity) using a High Resistivity Meter (Hiresta-Up MCP-HT450 available from Mitsubishi Chemical Corp.). The surface resistivity was about 4.7×10$^{10}$ ohm/square, within the functional range of an ITB of from about 10$^8$ to about 10$^{13}$ ohm/square.

The intermediate transfer member was measured for Young's modulus following the ASTM D882-97 process. A sample of the disclosed intermediate transfer member was placed in the measurement apparatus, an Instron Tensile Tester, and then elongated at a constant pull rate until breaking During this time, the instrument recorded the resulting load versus sample elongation. The modulus was calculated by taking any point tangential to the initial linear portion of this curve and dividing the tensile stress by the corresponding strain. The tensile stress was given by load divided by the average cross sectional area of the test specimen. The results are shown in Table 1 along with resistivity and hardness.

TABLE 1

| | Modulus (MPa) | Surface resistivity (ohm/sq) |
|---|---|---|
| The disclosed UV cured ITB | 1,500 | 4.7 × 10$^{10}$ |
| (polyester ITB), thermally cured | 1,200 | 7.9 × 10$^{11}$ |
| (polyamide ITB), thermally cured | 1,100 | 1.0 × 10$^{13}$ |
| (PVDF ITB), thermally cured | 1,000 | 6.3 × 10$^9$ |
| (polyimide ITB), thermally cured | 3,500 | 5.1 × 10$^{11}$ |

The disclosed UV cured ITB exhibited a higher modulus than most commercially available thermoplastic ITBs including those made of polyester, polyamide and PVDF. When compared with the polyimide ITB, the disclosed UV cured ITB exhibited lower modulus.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A method of forming a transfer member suitable for use with an image forming system, comprising:

coating an ultraviolet (UV) curable mixture comprising a chlorinated polyester resin, a reactive diluent, conductive species consisting of esters of phosphoric acid or esters of fatty acids, and a photoinitiator; and curing the UV curable mixture with ultraviolet energy to form an intermediate transfer member (ITB) wherein the conductive species is from about 5 weight percent to about 30 weight percent of the ITB.

2. The method of claim 1, wherein the reactive diluent is selected from the group consisting of trimethylolpropane triacrylate, hexandiol diacrylate, tripropyleneglycol diacrylate, dipropyleneglycol diacrylate, proxylated neopentylglycol diacrylate, hexamethylene diacrylate and mixtures thereof.

3. The method of claim 1, wherein the photoinitiator is selected from the group consisting of acyl phosphines, α-hydroxyketones, benzyl ketals, α-aminoketones, and mixtures thereof.

4. The method of claim 1, wherein the coating is selected from the group consisting of flow coating, liquid spray coating, dip coating, wire wound rod coating, fluidized bed coating, powder coating, electrostatic spraying, sonic spraying and blade coating.

5. An intermediate transfer belt (ITB) comprising:

a single layer comprising an ultraviolet cured chlorinated polyester having dispersed therein conductive species consisting of esters of phosphoric acid or esters of fatty acids and wherein the conductive species is from about 5 weight percent to about 30 weight percent of the ITB.

6. The intermediate transfer belt (ITB) of claim 5 wherein the chlorinated polyester is formed from a reaction of maleic acid at a weight percent of from about 10 to about 50, adipic acid at a weight percent of from about 5 to about 45, diethylene glycol at a weight percent of from about 5 to about 45, and a chlorinated aromatic aliphatic diol at a weight percent of from about 5 to about 40.

7. The intermediate transfer belt (ITB) of claim 5 wherein the chlorinated polyester has a number average molecular weight (Mn) of from about 500 to about 5,000.

8. The intermediate transfer belt (ITB) of claim 5 wherein the chlorinated polyester has a weight average molecular weight (Mw) of from about 1,000 to about 20,000.

9. The intermediate transfer belt (ITB) of claim 5, wherein the ITB has a Young's modulus of from about 500 MPa to about 10,000 MPa.

10. The intermediate transfer belt (ITB) of claim 5, wherein the ITB has a thickness of from about 30 microns to about 500 microns.

11. The intermediate transfer belt (ITB) of claim 5, wherein the ITB has a surface resistivity of from about $10^8$ ohms/square to about $10^{13}$ ohms/square.

* * * * *